United States Patent [19]

Toyota et al.

[11] 4,157,435

[45] Jun. 5, 1979

[54] PROCESS FOR PREPARING HIGHLY STEREOREGULAR POLYOLEFINS AND CATALYST USED THEREFOR

[75] Inventors: Akinori Toyota, Ohtake; Norio Kashiwa, Iwakuni; Syuji Minami, Ohtake, all of Japan

[73] Assignee: Mitsui Petrochemical Industries, Ltd., Tokyo, Japan

[21] Appl. No.: 710,658

[22] Filed: Aug. 2, 1976

Related U.S. Application Data

[63] Continuation-in-part of Ser. No. 545,874, Jan. 31, 1975, abandoned.

[30] Foreign Application Priority Data

Aug. 10, 1974 [JP] Japan .................................. 49-91181

[51] Int. Cl.$^2$ ........................... C08F 4/02; C08F 10/06
[52] U.S. Cl. ................................. 526/125; 252/429 B; 252/429 C; 526/73; 526/351; 526/906
[58] Field of Search ....................... 252/429 B, 429 C; 526/125, 128, 142

[56] References Cited

U.S. PATENT DOCUMENTS

| | | | |
|---|---|---|---|
| 3,238,146 | 3/1966 | Hewett et al. ........................ | 526/125 |
| 3,367,923 | 2/1968 | Tanaka et al. ........................ | 526/128 |
| 3,408,340 | 10/1968 | Tanaka et al. ........................ | 526/128 |
| 3,642,746 | 2/1972 | Kashiwa et al. ...................... | 526/125 |
| 3,701,763 | 10/1972 | Wada et al. .......................... | 526/128 |
| 4,048,415 | 9/1977 | Matsuzawa et al. .................. | 526/142 |

FOREIGN PATENT DOCUMENTS 2230672  12/1972  Fed. Rep. of Germany.
2426795  1/1975  Fed. Rep. of Germany.

*Primary Examiner*—Edward J. Smith
*Attorney, Agent, or Firm*—Sherman & Shalloway

[57] ABSTRACT

A process for preparing highly stereoregular polyolefins in the presence of a catalyst comprising (A) a titanium-containing solid catalyst component composed of an organic complex derived from (i) a magnesium halide
(ii) an organopolysiloxane selected from the group consisting of compounds of the formula $Q(Q_2SiO)_nSiQ_3$, $(Q_2SiO)_n$ and $X(Q_2SiO)_nSiQ_2X$, (iii) an organic carboxylic acid ester, and
(iv) a titanium compound of the formula $Ti(OR)_lX_{4-l}$, and (B) an organoaluminum catalyst component of the formula $R'_mAl(OR')_{3-m}$, said organic complex being derived by bringing the component (i) into contact with a combination of the components (ii) and (iii) or a combination of the components (ii), (iii) and (iv) under mechanical pulverisation conditions and then treating the resulting pulverized composition with the component (iv) in the absence of mechanical pulverization.

27 Claims, No Drawings

PROCESS FOR PREPARING HIGHLY STEREOREGULAR POLYOLEFINS AND CATALYST USED THEREFOR

This invention is a continuation-in-part of U.S. Ser. No. 545,874 filed Jan. 31, 1975, now abandoned.

This invention relates to a process for polymerizing α-olefins in the presence of a catalyst capable of maintaining its superior catalytic activity for prolonged periods of time thereby to afford a highly stereoregular α-olefin polymer or copolymer in a high yield which has a higher apparent density and a reduced content of halogen ascribable to the catalyst used; and to said catalyst.

Catalyst systems composed of solid titanium halides and organoaluminum compounds have previously been used for preparing highly stereoregular polymers of α-olefins. Polymerizations using these catalyst systems afford highly stereoregular polymers; but the yield of the polymer per unit amount of the titanium catalyst component is still low, and an additional step is required to remove the catalyst residue from the resulting polymer. Recently, some methods, for example, those disclosed in Japanese Laid-Open Patent Publications Nos. 16986/73 (German OLS No. 2,230,672), 16987/73 and 16988/73, have been proposed to remove the defects of the prior art techniques. These methods attempt to produce highly stereoregular poly(α-olefins) by polymerizing α-olefins such as propylene using a catalyst comprising a solid component which is obtained by copolymerizing a complex compound formed between a titanium halide and a specific electron donor together with an anhydrous magnesium halide, and the reaction product of a trialkyl aluminum and a specific electron donor. With these methods, however, the stereoregularity of the resulting polymer is still insufficient, and the yield of the polymer per titanium atom is still unsatisfactory. In addition, these methods further suffer from the defect that the yield of the polymer per chlorine atom in the catalyst is low because the co-pulverized product has a low level of titanium content, that the polymerization must be performed with a low slurry concentration becuase of the low apparent density of the resulting polymer, thus rendering the methods economically disadvantageous, and that the polymerization activity of the catalyst is lost within short periods of time.

French Laid-Open Patent Publication No. 2,113,313 (May 29, 1972) discloses a process for selectively preparing either an atactic polymer as a main product or a stereoregular polymer as a main product. This Patent Publication states that when a Ti catalyst component obtained by contacting a titanium compound with a mixture of an active-type magnesium halide carrier and an anhydrous compound of an element of Groups I to IV, for example, Si is used in the above process preferably in the form supported on a carrier and subsequently modified with an electron donor, a stereoregular polymer is obtained as a main product. This Publication, however, illustrates only $SiO_2$ as the anhydrous compound of Si. Furthermore, it discloses that ethers, thioethers, amines, phosphines, ketones and esters can be utilized as the electron donors, but does not exemplify any specific compounds that fall within the esters. The isotacticity of the polymer shown by the boiling n-heptane extraction residue in all of the Examples of the above Patent Publication is at most about 70%, and therefore, the process of this patent is far from satisfactory for preparing highly stereoregular polymers. On the other hand, the only electron donor used in this patent for production of isotactic polymers is N,N',N",N"'-tetramethyl ethylene diamine. Moreover, only anhydrous lithium chloride and $SiO_2$ are specifically used in this patent as the anhydrous compound of an element of Groups I to IV.

We have made investigations with a view to removing the defects of the conventional techniques, and consequently found that a titanium-containing catalyst component composed of an organic complex derived from (i) a magnesium halide, (ii) an organo-polysiloxane, (iii) an organic carboxylic acid ester and (iv) a specific Ti compound, when combined with an organo-aluminum compound, is a superior catalyst for preparation of highly stereoregular polyolefins. Our investigations also led to the discovery that by using this catalyst, highly stereoregular α-olefin polymers or copolymers can be prepared in high yields while maintaining superior catalytic activity over a long period of time, that the halogen content of the resulting polymer or copolymer ascribable to the catalyst can be reduced, and that the resulting polymers or copolymers have a high apparent density.

Accordingly, an object of this invention is to provide a process for preparing highly stereoregular polyolefins having the above-mentioned improved effects.

Another object of this invention is to provide a catalyst for use in the process of this invention.

Many other objects and advantages of this invention will become more apparent from the following description.

According to the present invention, there is provided a process for preparing highly stereoregular polyolefins, which comprises polymerizing or copolymerizing α-olefins having at least 3 carbon atoms in the presence of a catalyst, said catalyst comprising (A) a titanium-containing solid catalyst component composed of an organic complex derived from
(i) a magnesium halide,
(ii) an organo polysiloxane selected from at least one of the group consisting of:
compounds of the formula

wherein Q's are identical or different, and represent a moiety selected from the group consisting of hydrogen, alkyl, cycloalkyl and aryl, with the proviso that all Q moieties are not hydrogen at the same time, and n is an integer of 1 to 1000;
compounds of the formula

wherein Q is the same as defined above, and n is an integer of 2 to 1000; and
compounds of the formula

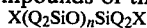

wherein Q is the same as defined above, n is an integer of 1 to 1000, and X is halogen,
(iii) an organic carboxylic acid ester, and
(iv) a titanium compound of the formula

wherein R is a moiety selected from the group consisting of alkyl groups and a phenyl group optionally substituted with an alkyl group with 1 to 4 carbon atoms, X is a halogen, and l is O or an integer of 1 to 4, and (B) at least one organoaluminum catalyst component of the formula $$R'_mAl(OR')_{3-m}$$

wherein R' moieties are identical or different, and represent alkyl, and m is a positive number of 1.5 to 3, said organic complex being derived by bringing the component (i) into contact with a combination of the components (ii) and (iii) in a molar ratio (i)/(ii)/(iii) of 1/1000-0.01/10-0.005 or a combination of the components (ii), (iii) and (iv) in a molar ratio (i)/(ii)/(iii)/(iv) of 1/1000-0.01/10-0.005/100-0.001 under mechanical pulverization conditions and then treating the resulting pulverized composition with the component (iv) in the absence of mechanical pulverization.

The polymerization or copolymerization of α-olefins having at least 3 carbon atoms, as referred to in this application, includes homopolymerization of α-olefins having at least 3 carbon atoms, copolymerizations of at least two different α-olefins having at least 3 carbon atoms with each other, and copolymerization of α-olefins having at least 3 carbon atoms with ethylene and/or diolefins in an amount of preferably up to 30 mol%.

Examples of the α-olefins are propylene, 1-butene, 4-methyl-1-pentene, and 3-methyl-1-butene, and examples of the diolefins include conjugated diolefins such as butadiene and non-conjugated dienes such as dicyclopentadiene, ethylidenenorbornene and 1,5-hexadiene.

The catalyst used in this invention is composed of the following titanium-containing solid catalyst component (A) and organoaluminum catalyst component (B).

Component (A) consists of an organic complex prepared from (i) a magnesium halide, (ii) an organopolysilaxane, (iii) an organic carboxylic acid ester, and (iv) a titanium compound of the formula $$Ti(OR)_lX_{4-l}$$

wherein R is a moiety selected from the group consisting of alkyl groups, for example, $C_1-C_4$ alkyl, and a phenyl group substituted by a $C_1-C_4$ alkyl group, X is a halogen atom such as Cl, Br and I and l is O or an integer of 1 to 4.

Examples of component (i) are magnesium chloride, magnesium bromide and magnesium iodide, the magnesium chloride ($MgCl_2$) being especially preferred.

Examples of component (ii) are:
organic polysiloxanes of the formula
$$Q(Q_2SiO)_nSiQ_3$$

wherein the Q troups are identical or different, and each represent a hydrogen atom, an alkyl group, for example, an alkyl group containing 1 to 4 carbon atoms, a cycloalkyl group, for example, a cycloalkyl group containing 3 to 8 carbon atoms, or an aryl group, for example, an aryl group containing 6 to 8 carbon atoms with the proviso that all Q groups are not hydrogen atoms at the same time, and n is an integer of 1 to 1000;
organic polysiloxanes of the formula $$(Q_2SiO)_n$$

wherein Q is the same as defined above, and n is an integer of 2 to 1000;
and organic polysiloxanes of the formula $$X(Q_2SiO)_nSiQ_2X$$

wherein Q is the same as defined above, and n is an integer of 1 to 1000, and x is a halogen atom.

Examples of the organic carboxylic acid esters (iii) include those derived from $C_1-C_8$, preferably $C_1-C_4$, saturated or unsaturated aliphatic carboxylic acids which may optionally be substituted by a halogen atom and alcohols selected from the group consisting of $C_1-C_8$, preferably $C_1-C_4$, saturated or unsaturated aliphatic primary alcohols, $C_3-C_8$, preferably $C_5-C_6$, saturated or unsaturated alicyclic alcohols and $C_1-C_4$ saturated or unsaturated aliphatic primary alcohols substituted by $C_6-C_{10}$, preferably $C_6-C_8$, aromatic groups or halogen atom; esters formed between $C_7-C_{12}$, preferably $C_7-C_{10}$, aromatic monocarboxylic acids and alcohols selected from the group consisting of $C_1-C_8$, preferably $C_1-C_4$, saturated or unsaturated aliphatic primary alcohols, $C_3-C_8$, preferably $C_5-C_6$, saturated or unsaturated alicyclic alcohols and $C_1-C_4$ saturated or unsaturated aliphatic primary alcohols substituted by $C_6-C_{10}$, preferably $C_6-C_8$ aromatic groups or halogen atoms; and alicyclic carboxylic acid esters such as methyl cyclopentanecarboxylate, methyl hexahydrobenzoate, ethyl hexahydrobenzoate, methyl hexahydrotoluate, and ethyl hexahydrotoluate.

In the present invention, a part or the whole of the organic carboxylic acid ester (iii) can be used in the form of ester-treated products or adducts of the compounds (i), (ii) and (iv) by bringing it in advance into contact with compounds, (i), (ii) and (iv).

Desirably, the magnesium halide (i) as a constituent of the titanium-containing solid catalyst component (A) is as anhydrous as possible, but the inclusion of moisture is permissible to an extent such that the moisture does not substantially affect the performance of the catalyst. The magnesium halide may be one obtained by dehydrating a commercially available grade at 100° to 400° C. under reduced pressure prior to use. For convenience of use, the magnesium halide is preferably used in the form of a powder having an average particle diameter of 1 to 50 microns. But when it is to be pulverized by a mechanical contacting treatment during catalyst preparation, powders of larger particle sizes can also be used. An average particle diameter of 1 to 50 microns means that at least 80% by weight of the total particles have a particle diameter of 1 to 50 microns.

Specific examples of linear polysiloxanes of the formula $Q(Q_2SiO)_nSiQ_3$ as the Si component (ii) are hexamethyldisiloxane, decamethyltetrasiloxane, tetracosamethylundecasiloxane, 3-hydroheptamethyltrisiloxane, 3,5-dihydrooctamethyltetrasiloxane, 3,5,7-trihydrononamethylpentasiloxane, tetramethyl-1,3-diphenyldisiloxane, pentamethyl-1,3,5-triphenyltrisiloxane, heptaphenyldisiloxane, and octaphenyltrisiloxane.

Specific examples of cyclopolysiloxanes of the formula $(Q_2SiO)_n$ as the Si component (ii) include 2,4,6-trimethylcyclotrisiloxane, 2,4,6,8-tetramethylcyclotetrasiloxane, hexamethylcyclotrisiloxane, octamethylcyclotetrasiloxane, decamethylcyclopentasiloxane, dodecamethylcyclohexasiloxane, triphenyl-1,3,5-trimethylcyclotrisiloxane, hexaphenylcyclotrisiloxane, and octaphenylcyclotetrasiloxane.

Specific examples of linear, α,ω-dihalo polysiloxanes of the formula $X(Q_2SiO)_nSiQ_2X$ as the Si component include 1,3-dichlorotetramethyldisiloxane, 1,5-dichlorohexamethyltrisiloxane, and 1,7-dichlorooctamethyl tetrasiloxane.

Of these organic polysiloxanes, the linear alkylpolysiloxanes are preferred. Methylpolysiloxane and ethylpolysiloxane having a viscosity of not more than 200 centipoises at 25° C. are especially preferred.

Specific examples of the organic carboxylic acid ester as component (iii) of the titanium-containing solid catalyst component (A) are primary alkyl esters of monovalent saturated fatty acids such as methyl formate, ethyl acetate, n-amyl acetate, 2-ethylhexyl acetate, n-butyl formate, ethyl butyrate, or ethyl valerate; benzyl acetate; allyl acetate; primary alkyl esters of haloaliphatic carboxylic acids such as ethyl chloroacetate, n-propyl dichloroacetate and ethyl chlorobutyrate; primary alkyl esters of unsaturated fatty acids such as methyl acrylate, methyl methacrylate or i-butyl crotonate; primary alkyl esters of benzoic acid such as methyl benzoate, ethyl benzoate, n-propyl benzoate, n- and i-butyl benzoates, n-and i-amyl benzoates, n-hexyl benzoate, n-octyl benzoate and 2-ethylhexyl benzoate; primary alkyl esters of toluic acid such as methyl toluate, ethyl toluate, n-propyl toluate, n- and i-butyl toluates, n- and i-amyl toluates or 2-ethylhexyl toluate; primary alkyl esters of ethylbenzoic acid such as methyl ethylbenzoate, ethyl ethylbenzoate, n-propyl ethylbenzoate, and n- and i-butyl ethylbenzoates; primary alkyl esters of xylylenecarboxylic acid such as methyl 3,4-xylylene-1-carboxylate, ethyl 3,5-xylylene-1-carboxylate, and n-propyl 2,4-xylylene-1-carboxylate; primary alkyl esters of anisic acid such as methyl anisate, ethyl anisate, n-propyl anisate, and n- and i-butyl anisates; and primary alkyl esters of naphthoic acid such as methyl naphthoate, ethyl naphthoate, n-propyl naphthoate, and n- and i-butyl naphthoates.

Of these primary alkyl esters of aromatic carboxylic acids, primary $C_1$-$C_4$ alkyl esters are preferred. Methyl benzoate and ethyl benzoate are especially preferred.

As already mentioned, a part or the whole of the organic carboxylic acid ester (iii) can be used in the form of ester-treated products or adducts of the compounds (i), (ii) and (iv) by bringing it in advance into contact with these compounds (i), (ii) and (iv).

Specific examples of the titanium compound of formula $Ti(OR)_iX_{4-l}$ [component (iv)] include titanium tetrahalides such as titanium tetrachloride, titanium tetrabromide or titanium tetraiodide; alkoxy titanium trihalides such as methoxy titanium trichloride, ethoxy titanium trichloride, n-butoxy titanium trichloride, ethoxy titanium tribromide or i-butoxy titanium tribromide; dialkoxy titanium dihalides such as dimethoxy titanium dichloride, diethoxy titanium dichloride, di-n-butoxy titanium dichloride or diethoxy titanium dibromide; trialkoxy titanium monohalides such as trimethoxy titanium chloride, triethoxy titanium chloride, tri-n-butoxy titanium chloride and triethoxy titanium bromide; tetraalkoxy titanium compounds such as tetramethoxy titanium, tetraethoxy titanium and tetra-n-butoxy titanium; phenoxy titanium trihalides such as trichlorides or tribromides; and diphenoxy titanium dihalides such as dichlorides or dibromides. Of these, the titanium tetrahalides, especially titanium tetrachloride, are preferred.

When a magnesium halide (i) treated with the organic carboxylic acid ester (iii) is used in the formation of the titanium-containing solid catalyst component (A) used in this invention, it is preferred to use a mechanical pulverizing means for contacting both with each other. According to this pulverizing contact, the organic acid ester in a wide range of proportions acts effectively on the magnesium halide. A sufficient treating effect can be obtained even if the proportion of the former is small as compared with the latter (in a molar ratio of about 1/1 to 1/20).

When the Si component (ii) treated with the organic carboxylic acid ester (iii) is used, the treatment is effected, for example, by a method comprising adding the organic carboxylic acid ester at room temperature to a silicon compound itself or its solution in a suitable inert solvent such as pentane, hexane, heptane or kerosene, or a method comprising preparing a solution of the organic carboxylic acid ester in the above inert solvent, and then adding the silicon compound to the solution. Of course, the treating can be completed within short periods of time at an elevated temperature, but if desired, the treatment can also be carried out under cooling.

When the titanium compound (iv) is used in the form of an adduct with the organic carboxylic acid ester (iii), the adduct can be prepared by adding the organic carboxylic acid ester (iii) in an equimolar or larger amount (calculated based on the ester) to the titanium compound itself (if it is liquid) or a solution of it in the above inert solvent (if it is solid), and separating the resulting precipitate by filtration. Even when the titanium compound is liquid, it can be used in the adduct-forming reaction in the form of its solution in the above inert solvent. Washing of the resulting precipitate (the removal of the unreacted titanium compound and organic carboxylic acid ester) can also be carried out using the bove solvent.

When contacting the components (i) to (iv) under mechanical pulverization conditions, the molar ratio of the magnesium halide (i)/the Si component (ii)/the organic carboxylic acid ester (iii)/the titanium compound (A) is preferably 1/1000–0.01/10–0.005/100–0.001, more preferably 1/10–0.01/1–0.01/30–0.01.

Preferably, the titanium-containing solid catalyst component (A) of an organic complex derived from the components (i), (ii), (iii) and (iv) is prepared by bringing the component (i) into contact with a combination of the components (ii) and (iii) or a combination of the components (ii), (iii) and (iv) under mechanical pulverization conditions in the molar ratios described above, and then treating the resulting pulverized composition with the component (iv) in the absence of mechanical pulverization. At this time, the molar ratio of the component (iv) to the component (i) is preferably at least 0.001, for example, 0.001 to 10000 or more, the upper limit not being set in particular.

A number of modes are possible in regard to the order of addition of these components, the method of addition and the method of contacting, and some examples are shown below.

(1) The anhydrous magnesium halide (i), the organic polysiloxane (ii), the organic carboxylic acid ester (iii) and the titanium compound (iv) are contacted with each other intimately by a mechanical pulverizing means (to be referred to as pulverizing contact) and the resulting titanium-containing solid component is treated preferably with the compound (iv) or its solution in an inert solvent.

(2) The magnesium halide (i), the organic polysiloxane (ii), and the organic carboxylic acid ester (iii) are pulverizingly contacted. The resulting solid component is treated by suspending in the titanium compound (iv) or its solution in an inert solvent. Or the solid component and the titanium compound (iv) are pulverizingly contacted in the substantially dry state, and then treated by suspending preferably in the titanium compound (iv) or its solution in an inert solvent.

(3) The anhydrous magnesium halide (i) and the organic carboxylic acid ester (iii) are pulverizingly contacted and then further contacted pulverizingly with the organic polysiloxane (ii) to form a solid component. Or the magnesium halide (i) and the Si component (ii) are first pulverizingly contacted and then with the organic carboxylic acid ester (iii) to form a solid component. Either of such solid components is suspended in the titanium compound (iv) or its solution in an inert solvent to treat it. Or the solid component is pulverizingly contacted with the titanium component (iv) substantially in the dry state, and then suspended preferably in the titanium compound (iv) or its solution in an inert solvent to treat it.

(4) The anhydrous magnesium halide (i), the organic polysiloxane (ii) and an adduct of the titanium compound (iv) and the organic carboxylic acid ester (iii) are pulverizingly contacted, and the resulting titanium-containing solid component is suspended preferably in the titanium compound (iv) or its solution in an inert solvent to treat it.

(5) The anhydrous magnesium halide (i) and the organic polysiloxane (ii) are pulverizingly contacted, and then further pulverizingly contacted with an adduct of the titanium compound (iv) and the organic carboxylic acid ester (iii). The resulting titanium-containing solid component is suspended preferably in the titanium compound (iv) or its solution in an inert solvent to treat it.

(6) In the procedures of (1) and (3) above, the titanium compound (iv) is used in the form of an adduct of it with the organic carboxylic acid ester (iii).

(7) The anhydrous magnesium halide (i), and organic polysiloxane (ii), the titanium compound (iv), and an adduct of the titanium compound (iv) and the organic carboxylic acid ester (iii) are pulverizingly contacted, and the resulting titanium-containing solid component is suspended preferably in the titanium compound (iv) or its solution in an inert solvent to treat it.

(8) In the procedure in paragraph (7) above, the organic carboxylic acid ester (iii) itself is also added to the pulverizing contact system.

The above modes are listed below. The numbers attached to these modes are referred to in the methods of preparing the titanium-containing solid catalyst component shown in the Examples below.

(No. 1) The titanium-containing solid catalyst component composed of an organic complex is derived by bringing the component (i) into contact with components (ii), (iii) and (iv) under mechanical pulverization conditions and then treating the resulting pulverized composition with the component (iv) in the absence of mechanical pulverization.

[(i)—(ii)—(iii)—(iv)] pulverization→treatment of the pulverized product with (iv).

(No. 2) The titanium-containing solid catalyst component composed of an organic complex is derived by bringing the component (i) into contact with components (ii) and (iii) under mechanical pulverization conditions and then treating the resulting pulverized composition with the component (iv) in the absence of mechanical pulverization.

[(i)—(ii)—(iii)] pulverization→treatment of the pulverized product with (iv).

(No. 3) The titanium-containing solid catalyst component composed of an organic complex is derived by bringing the component (i) into contact with components (ii) and (iii) under mechanical pulverization conditions, then contacting the resulting pulverized product with the component (iv) under mechanical pulverization conditions and then treating the resulting pulverized composition with the component (iv) in the absence of mechanical pulverization.

[(i)—(ii)—(iii)] pulverization→[pulverized product-(iv)] pulverization→treatment of the pulverized product with (iv).

(No. 4) The titanium-containing solid catalyst component composed of an organic complex is derived by bringing the component (i) into contact with component (iii) under mechanical pulverization conditions, then contacting the resulting pulverized product with the component (ii) under mechanical pulverization conditions and then treating the resulting pulverized composition with the component (iv) in the absence of mechanical pulverization.

[(i)—(iii)] pulverization→[pulverized product-(ii)] pulverization→treatment of the pulverized product with (iv).

(No. 5) The titanium-containing solid catalyst component composed of an organic complex is derived by bringing the component (i) into contact with component (iii) under mechanical pulverization conditions, then contacting the resulting pulverized product with the component (ii) under mechanical pulverization conditions, and further contacting the resulting pulverized product with the component (iv) under mechanical pulverization conditions and then treating the resulting pulverized composition with the component (iv) in the absence of mechanical pulverization.

[(i)—(iii)] pulverization→[pulverized product-(ii)] pulverization→[pulverized product-(iv)] pulverization→treatment of the pulverized product with (iv).

(No. 6) The titanium-containing solid catalyst component composed of an organic complex is derived by bringing the component (i) into contact with component (ii) under mechanical pulverization conditions, then contacting the resulting pulverized product with the component (iii) under mechanical pulverization conditions and then treating the resulting pulverized composition with the component (iv) in the absence of mechanical pulverization.

[(i)—(ii)] pulverization→[pulverized product-(iii)] pulverization→treatment of the pulverized product with (iv).

(No. 7) The titanium-containing solid catalyst component composed of an organic complex is derived by bringing the component (i) into contact with component (ii) under mechanical pulverization conditions, then contacting the resulting pulverized product with the component (iii) under mechanical pulverization conditions, and further contacting the resulting pulverized product with the component (iv) under mechanical pulverization conditions and then treating the resulting pulverized composition with the component (iv) in the absence of mechanical pulverization.

[(i)—(ii)] pulverization→[pulverized product-(iii)] pulverization→[pulverized product-(iv)] pulverization→treatment of the pulverized product with (iv).

(No. 8) The titanium-containing solid catalyst component composed of an organic complex is derived by bringing the component (i) into contact with component (ii) and an adduct of component (iv) and component (iii) under mechanical pulverization conditions, and then treating the resulting pulverized composition with the component (iv) in the absence of mechanical pulverization.

[(i)—(ii)—(iii).(iv) Adduct] pulverization→treatment of the pulverized product with (iv).

(No. 9) The titanium-containing solid catalyst component composed of an organic complex is derived by bringing the component (i) into contact with component (ii) under mechanical pulverization conditions, then contacting the resulting pulverized product with an adduct of component (iv) and component (iii) under mechanical pulverization conditions and then treating the resulting pulverized composition with the component (iv) in the absence of mechanical pulverization.

[(i)—(ii)] pulverization→[pulverized product-(iii).(iv) Adduct] pulverization→treatment of the pulverized product with (iv).

(No. 10) The titanium-containing solid catalyst component composed of an organic complex is derived by bringing the component (i) into contact with components (ii), (iii) and an adduct of component (iv) and component (iii) under mechanical pulverization conditions and then treating the resulting pulverized composition with the component (iv) in the absence of mechanical pulverization.

[(i)—(ii)—(iii).(iv) Adduct] pulverization→treatment of the pulverized product with (iv).

(No. 11) The titanium-containing solid catalyst component composed of an organic complex is derived by bringing the component (i) into contact with components (ii), (iv) and an adduct of component (iv) and component (iii) under mechanical pulverization conditions and then treating the resulting pulverized composition with the component (iv) in the absence of mechanical pulverization.

[(i)—(ii)—(iv)—(iii).(iv) Adduct] pulverization→treatment of the pulverized product with (iv).

(No. 12) The titanium-containing solid catalyst component composed of an organic complex is derived by bringing the component (i) into contact with components (ii), (iii), (iv) and an adduct of component (iv) and component (iii) under mechanical pulverization conditions and then treating the resulting pulverized composition with the component (iv) in the absence of mechanical pulverization.

[(i)—(ii)—(iii)—(iv)—(iii).(iv) Adduct] pulverization→treatment of the pulverized product with (iv).

(No. 13) In the methods Nos. 1 to 12 above, an adduct of component (i) and component (iii) is used instead of component (i) or component (iii) or both. Furthermore, in the methods Nos. 1 to 12, an adduct of components (i) and (iii) is used in addition to the components (i) and (iii).

The pulverizingly contact means in the preparation of the titanium-contacting solid titanium component (A) in the present invention may, for example, include means using a rotary ball mill, a vibratory ball mill, or an impact mill. As a result of contact by such a pulverizing contact means, the organic carboxylic acid ester (iii), the organic polysiloxane (ii) and the titanium compound (iv) immediately act on the active surface resulting from the pulverization of the magnesium halide (i) to form an organic complex whose chemical structure has not yet been elucidated. This can be confirmed by the fact that the diffraction pattern of the magnesium halide changes.

The treating conditions employed for pulverizingly contacting two or more of the starting materials for the catalyst component (A) using various mills can be selected as follows:

Taking up the use of a rotary ball mill as an example, 100 balls each with a diameter of 15 mm made of stainless steel (SUS 32) were accomodated in a ball cylindrical receptacle made of stainless steel (SUS 32) and having an inner capacity of 800 ml. and an inside diameter of 100 mm. When 20 to 40 g of the materials are placed in it, the pulverization treatment is carried out usually for at least 48 hours, preferably at least 72 hours at a speed of 125 rpm. The temperature for the pulverization treatment is usually a point in the vicinity of room temperature. When there is a marked exotherm, the system is preferably cooled, and the pulverizing contact is performed at a temperature lower than room temperature.

The treatment of the solid component obtained by pulverizing contact of the starting materials of the solid component (A) with the titanium compound (iv) can be suitably carried out by stirring the mixture usually at 40° C. to the boiling point of the treating mixture for at least 1 hour.

When titanium compounds are used on two different occasions in the above treatment procedure, they may be the same as, or different from, each other so long as they are chosen from compounds of the above general formula.

The titanium-containing solid catalyst component (A) results after separating the organic complex solid prepared in the above manner from the suspension. Preferably, it is fully washed with hexane or other inert liquid media so that the free titanium compound (iv) is no longer detected in the wash liquid.

The catalyst component (B) to be combined with the catalyst component (A) in the present invention is an organoaluminum compound of the general formula $R'_m Al(OR')_{3-m}$ wherein $R'$ is an alkyl group, preferably a $C_1$-$C_4$ straight-chain or branched-chain alkyl group, the two or more $R'$ groups being identical or different, and m is a number in the range of $1.5 \leq m \leq 3$.

Examples of the organoaluminum compound are as follows:

(1) When m is 3, the compound is a trialkyl aluminum. Specific examples are trimethyl aluminum, triethyl aluminum, tri-n- and -i-propyl aluminums, tri-n- and -i-butyl aluminums, and trihexyl aluminum. The triethyl aluminum and tributyl aluminum are preferred. They may also be used in combinations of two or more.

If desired, the trialkyl aluminum may be reacted with the organic carboxylic acid ester prior to use. This reaction may be carried out in the polymerization system before the initiation of polymerization; or it may be carried out separately, and then the reaction product is added to the polymerization system. The reaction proceeds sufficiently by contacting the trialkyl aluminum directly with an organic carboxylic acid ester (or using one of them as a solution in an inert solvent). The ratio between the amounts of these materials is such that the proportion of the trialkyl aluminum is usually 2 to 100 mols (based on the aluminum atom) per gram equivalent of the ester group of the organic carboxylic acid ester. The organic carboxylic acid ester may be selected from the various organic carboxylic acid esters as component (iii) in the formation of the catalyst component (A). Usually, it may be the same kind of acid ester as that used in forming the catalyst component (A). (2) When m is at least 1.5 but below 3 ($1.5 \leq m \leq 3$), the above aluminum compound is a partially alkoxylated alkyl aluminum. Such an alkyl aluminum is preferred, for example, by adding a calculated amount of an alcohol to a trialkyl aluminum or dialkyl aluminum hydride. Since this reaction is vigorous, at least one of them is preferably used as a solution in an inert solvent in order to cause the reaction to proceed mildly.

In order to polymerize or copolymerize α-olefins having at least 3 carbon atoms using the catalyst composed of the titanium-containing solid catalyst component (A) and the organoaluminum catalyst component (B), polymerization conditions known to be employed in polymerizations or copolymerizations of α-olefins using Ziegler-type catalysts can be properly chosen. Usually, polymerization temperatures of from room temperature to about 200° C. and pressures from atmospheric pressure to about 50 Kg/cm$^2$ can be used. The polymerizations or copolymerizations can be carried out either in the presence or in the absence of an inert liquid medium. Examples of the liquid medium are pentane, hexane, heptane, ios-octane and kerosene. Where the polymerization or copolymerization is carried out in the absence of a liquid medium, it may be performed in the presence of a liquid olefin monomer, or it may be carried out in the vapor phase, for example, by using a fluidized bed catalyst.

The concentration of the catalyst to be charged into the polymerization system for polymerization can be changed as desired. For example, in solid-phase polymerizations, the titanium-containing solid catalyst component (A) is used in a concentration of usually 0.0001 to 1.0 m-mol/liter calculated as titanium atom, and the catalyst component (B) is used in a concentration of usually 1/1 to 100/1, preferably 1/1 to 30/1, in terms of the aluminum atom/titanium atom ratio. In vaporphase polymerizations, the titanium-containing solid catalyst component (A) can be used in a concentration of 0.001-0.5 m-mol (calculated as titanium atom), and the catalyst component (B), in an amount of 0.01-5 m-mol (calculated as aluminum atom), both per liter of the volume of the reaction zone.

In order to lower the molecular weight of the resulting polymer (and thus increase the melt index of the polymer), hydrogen may be present in the polymerization system.

The following Examples and Comparative Examples illustrate the present invention more specifically.

EXAMPLE 1

Preparation of Catalyst Component (A):-

A 800 ml. stainless steel (SUS 32) ball mill with an inside diameter of 100 mm accomodating therein 100 stainless steel (SUS 32) balls each with a diameter of 15 mm was charged with 20 g of anhydrous magnesium chloride, 6.0 ml. of ethyl benzoate and 3.0 ml. of methyl polysiloxane (having a viscosity of 20 centipoises at 25° C.) in an atmosphere of nitrogen, and pulverizingly contacted for 100 hours at a rotating speed of 125 rpm. The resulting solid product was suspended in 150 ml. of titanium tetrachloride, and the suspension was stirred at 80° C. for 2 hours. Then, the solid component was collected by filtration, and washed with purified hexane until free titanium tetrachloride was no longer detected. The resulting component contained 4.1% by weight of titanium and 58.2% by weight of chlorine as atoms.

Polymerization:-

A 2-liter autoclave was charged with 0.05 ml. (0.375 m-mol) of triethyl aluminum, 43.8 mg (0.0375 m-mol calculated as titanium atom) of the titanium-containing solid component (A) obtained above and 750 ml. of kerosene (purified kerosene) sufficiently free from oxygen and moisture. The polymerization system was heated, and when the temperature reached 70° C., propylene was introduced. Polymerization of the propylene was started at a total pressure of 7.0 Kg/cm$^2$. After continuing the polymerization at 70° C. for 3 hours, the introduction of propylene was stopped. The inside of the autoclave was cooled to room temperature, and the catalyst was decomposed by addition of methanol. The solid component was collected by filtration, washed with methanol, and dried to afford 410.3 g of polypropylene as a white powder. The boiling n-heptane extraction residue (II) of the powder was 94.5%, and its apparent density was 0.30 g/ml.

Concentration of the liquid phase afforded 15.1 g of a solvent-soluble polymer.

The average specific polymerization activity per titanium atom of the catalyst used above was 540 g/Ti-m-.M.hr.atm. The results of the polymerization are illustrated in Table 1.

COMPARATIVE EXAMPLE 1

A titanium catalyst component (A) was prepared in the same way as in Example 1 except that 6.0 ml. of methyl benzoate was not used.

Using the titanium catalyst component (A) so formed, propylene was polymerized in the same way as in Example 1.

The results of the polymerization are also shown in Table 1 below.

COMPARATIVE EXAMPLE 2

Using the titanium catalyst component (A) prepared in Comparative Example 1, propylene was polymerized in the same way as in Example 1 except that 0.071 millimol of ethyl benzoate was fed to the autoclave together with the titanium catalyst component (A) and triethyl aluminum.

The results of the polymerization are also shown in Table 1.

Table 1

| | Catalyst component | | | | | Amount of catalyst component used for polymerization | | | |
|---|---|---|---|---|---|---|---|---|---|
| | Amount used | | | (A) Components of Ti and Cl | | Component | | ethyl | methyl poly- |
| No. | MgCl$_2$ | ethyl benzoate (ml) | methyl polysiloxane (ml) | Ti (wt. %) | Cl (wt. %) | (A) (m mol) | Et$_3$Al (m mol) | benzoate (m mol) | siloxane (ml) |
| Example 1 | 20 | 6.0 | 3.0 | 4.1 | 58.2 | 0.0375 | 0.375 | — | — |
| Comparative Example 1 | 20 | — | 3.0 | 2.0 | 65.0 | 0.0375 | 0.375 | — | — |
| Comparative Example 2 | 20 | — | 3.0 | 2.0 | 65.0 | 0.0375 | 0.375 | 0.071 | — |

| | Results of polymerization | | | | |
|---|---|---|---|---|---|
| No. | Amount of powdery polymer (g) | Amount of soluble polymer (g) | Extraction residue of the powdery polymer (%) | Apparent density (g/ml.) | Average specific activity* |
| Example 1 | 410.3 | 15.1 | 94.5 | 0.31 | 540 |
| Comparative Example 1 | 105.4 | 94.3 | 63.8 | 0.25 | 250 |
| Comparative Example 2 | 30.5 | 6.4 | 88.3 | 0.26 | 47 |

*grams of polypropylene/Ti m-mol · hr · atm.

COMPARATIVE EXAMPLE 3

Preparation of a titanium-containing catalyst component:

A ball mill of the same type as used in Example 1 was charged with 20 g of anhydrous magnesium chloride and 17.8 g of an adduct having the average composition of the formula TiCl$_4$·C$_6$H$_5$COOC$_2$H$_5$, and they were contacted pulverizingly under the same conditions as in Example 1 for 100 hours at a speed of 125 rpm. The resulting solid titanium catalyst component (corresponding to the component (A) in Example 1) was considerably agglomerated in a ball mill, and was difficult to obtain in powder form. A part of the solid component was washed with 1 liter of purified hexane to the same extent as in Example 1, and dried to form a titanium catalyst component. The titanium catalyst component contained 4.2% by weight of titanium and 63.0% by weight of chlorine calculated as atoms. Polymerization:

Propylene was polymerized under the same conditions as in Example 1 using 114 mg of the titanium catalyst component obtained above. There were only obtained 8.8 g of polypropylene as a white powder and 1.7 g of a solvent-soluble polymer.

EXAMPLE 2

Preparation of Catalyst Component (A):

A 800 ml. stainless steel (SUS 32) ball mill with an inside diameter of 100 mm accomodating therein 100 stainless steel (SUS 32) balls each with a diameter of 15 mm was charged with 20 g of anhydrous magnesium chloride, 3.98 g of ethyl benzoate, 3.0 ml. of methyl polysiloxane (having a viscosity of 20 centipoises at 25° C.) and 2.65 g of titanium tetrachloride in an atmosphere of nitrogen, and pulverizingly contacted for 100 hours at a rotating speed of 125 rpm. The resulting solid product was suspended in 150 ml. of titanium tetrachloride, and the suspension was stirred at 80° C. for 2 hours. Then, the solid component was collected by filtration, and washed with purified hexane until free titanium tetrachloride was no longer detected. The resulting component contained 2.8% by weight of titanium and 63.0% by weight of chloride as atoms.

Polymerization:

A 2-liter autoclave was charged with 0.05 ml. (0.375 m-mol) of triethyl aluminum, 43.8 mg (0.0375 m-mol) calculated as titanium atom) of the titanium-containing solid component (A) obtained above and 750 ml. of kerosene (purified kerosene) sufficiently free from oxygen and moisture. The polymerization system was heated, and when the temperature reached 70° C., propylene was introduced. Polymerization of the propylene was started at a total pressure of 7.0 Kg/cm$^2$. After continuing the polymerization at 70° C. for 3 hours, the introduction of propylene was stopped. The inside of the autoclave was cooled to room temperature, and the catalyst was decomposed by addition of methanol. The solid component was collected by filtration, washed with methanol, and dried to afford 280.4 g of polypropylene as a white powder. The boiling n-heptane extraction residue (II) of the powder was 93.3%, and its apparent density was 0.34 g/ml.

Concentration of the liquid phase afforded 16.2 g of a solvent-soluble polymer.

The average specific polymerization activity per titanium atom of the catalyst used above was 377 g/Ti-m M.hr° atm.

COMPARATIVE EXAMPLE 4

Catalyst component (A) was prepared in the same way as in Example 2 except that methyl polysiloxane was not used. Using the catalyst component so formed, propylene was polymerized in the same way as in Example 2 except 0.005 ml or 3.0 ml of methyl polysiloxane was fed to the autoclave together with the titanium catalyst component and triethyl aluminum.

The results of the polymerization are shown in Table 2 together with those of Example 2.

COMPARATIVE EXAMPLE 5

Catalyst component (A) was prepared in the same way as in Example 2 except that both ethyl benzoate and methyl polysiloxane were not used. Using the catalyst component so formed, propylene was polymerized in the same way as in Example 2 except that 0.071 m-mol or 3.98 m-mol of ethyl benzoate and 0.05 ml or 3.0 ml of methyl polysiloxane were fed to the autoclave together with the catalyst component (A) and triethyl aluminum.

The results of the polymerization are shown in Table 2.

COMPARATIVE EXAMPLE 6

Catalyst component (A) was prepared in the same way as in Example 2 except that both ethyl benzoate and methyl polysiloxane were not used. Using the catalyst component so formed, propylene was polymerized in the same way as in Example 2 except that 0.071 m-mol or 3.98 m-mol of triethyl aluminum was fed to the autoclave together with the catalyst component (A) and triethyl aluminum.

The results of the polymerization are shown in Table 2.

COMPARATIVE EXAMPLE 7

Propylene was polymerized in the same way as in Example 2 using the same catalyst component (A) except that 2.4 g of silica was used in place of methyl polysiloxane.

The results of the polymerization are shown in Table 2.

Table 2

| No. | Catalyst component Amount used | | | | (A) Components of Ti and Cl | | Amount of catalyst component used for polymerization | | | |
|---|---|---|---|---|---|---|---|---|---|---|
| | MgCl$_2$ (g) | ethyl benzoate (ml) | methyl poly- siloxane (ml) | TiCl$_4$ (g) | Ti (wt. %) | Cl (wt. %) | Component (A) (m mol) | Et$_3$Al (m mol) | ethyl benzoate (m mol) | methyl poly- siloxane (ml) |
| Example 2 | 20 | 3.98 | 3.0 | 2.65 | 2.8 | 63.0 | 0.0375 | 0.375 | — | — |
| Comparative Example 4 | 20 | 3.98 | — | 2.65 | 3.0 | 63.0 | 0.0375 | 0.375 | — | 0.005 3.0 |
| Comparative Example 5 | 20 | — | — | 2.65 | 2.9 | 65.0 | 0.0375 | 0.375 | 0.071 3.98(ml) (27.9m mol) | 0.005 3.0 |
| Comparative Example 6 | 20 | — | — | 2.65 | 2.9 | 65.0 | 0.0375 | 0.375 | 0.071 3.98(ml) (27.9m mol) | — |
| Comparative Example 7 | 20 | 3.98 | SiO$_2$ 2.4 g | 2.65 | 2.5 | 59.0 | 0.0375 | 0.375 | — | — |

| No. | Results of polymerization | | | | |
|---|---|---|---|---|---|
| | Amount of powdery polymer (g) | Amount of soluble polymer (g) | Extraction residue of the powdery polymer (%) | Apparent density (g/ml.) | Average specific activity* |
| Example 2 | 280.4 | 16.2 | 93.3 | 0.34 | 377 |
| Comparative Example 4 | 223.4 | 19.3 | 91.8 | 0.30 | 308 |
| | 209.6 | 24.6 | 90.0 | 0.30 | 297 |
| Comparative Example 5 | 36.4 no polymer | 6.5 — | 86.5 — | 0.21 — | 54 — |
| Comparative Example 6 | 39.8 no poymer | 7.1 — | 86.4 — | 0.21 — | 60 — |
| Comparative Example 7 | 162.7 | 13.8 | 89.4 | 0.27 | 224 |

*grams of polypropylene/Ti-m mol · hr · atm.

EXAMPLES 3 TO 6

In each run, a titanium catalyst component (A) was prepared in the same way as in Example 1 except that each of the polysiloxanes described in Table 3 was used. Propylene was polymerized under the same conditions as in Example 1 using the resulting titanium catalyst component in the amount indicated in Table 3. The results are shown in Table 3.

Table 3

| Exam- ples | Catalyst component | | | Results of polymerization | | | | |
|---|---|---|---|---|---|---|---|---|
| | Organic polysiloxane (amount in ml.) | (A) Contents of Ti and Cl | | Amount of powdery polymer (g) | Amount of soluble polymer (g) | Extraction residue of the powdery polymer (%) | Apparent density (g/ml.) | Average specific activity* |
| | | Ti (wt. %) | Cl (wt. %) | | | | | |
| 3 | Methylhydropoly- siloxane (3) | 4.0 | 58.0 | 330 | 18.0 | 93.9 | 0.29 | 442 |
| 4 | Hexamethyldisiloxane (3) | 3.7 | 59.5 | 395 | 17.6 | 93.5 | 0.28 | 524 |
| 5 | 1,3-Dichlorotetra- methyldisiloxane (3) | 3.8 | 59.4 | 386 | 19.0 | 94.4 | 0.29 | 514 |
| 6 | 3-Hydroheptamethyl trisiloxane (3) | 3.0 | 61.2 | 375 | 15.1 | 93.9 | 0.29 | 495 |

*grams of polypropylene/Ti m-mol · hr · atm.

EXAMPLES 7 TO 9

In each run, a catalyst component (A) was prepared under the same conditions as in Example 1 except that each of the substituted benzoic acid esters shown in Table 4 was used in the amount shown in Table 4. Propylene was polymerized in the same way as in Example 1 using the catalyst component (A) in the amount shown in Table 4. The results are shown in Table 4.

ture reached 70° C., propylene was introduced. The polymerization of propylene was started at a total pressure of 7.0 Kg/cm$^2$. With stirring, the polymerization was carried out for 5 hours at 70° C. with stirring, and then the introduction of propylene was stopped. The inside of the autoclave was cooled to room temperature, and the solid component was collected by filtration, washed with methanol and dried to afford 390.4 g of polypropylene as a white powder and 12.1 g of a sol- Table 4

| | Catalyst component (A) | | | | Results of polymerization | | | |
|---|---|---|---|---|---|---|---|---|
| | | Ti and Cl contents | | | Yield of polymer (g) | | Extraction residue of powdery | Apparent | Average |
| Examples | Organic acid ester (amount in ml.) | Ti (wt. %) | Cl (wt. %) | Amount used (mg) | Powdery polymer | Soluble polymer | polymer (%) | density (g/ml.) | specific activity* |
| 7 | n-Butyl benzoate (7.48) | 4.5 | 54.6 | 39.9 | 401 | 19.2 | 94.2 | 0.28 | 533 |
| 8 | Methyl benzoate (7.43) | 4.0 | 59.0 | 44.6 | 425 | 14.1 | 94.6 | 0.29 | 560 |
| 9 | Ethyl chloroacetate (7.43) | 3.6 | 59.2 | 49.3 | 410 | 25.0 | 93.2 | 0.28 | 552 |

*Same as the footnote to Table 3.

EXAMPLE 10

Preparation of Catalyst Component (A):

A solid component was prepared by the ball mill treatment of anhydrous magnesium chloride, ethyl benzoate and methylhydropolysiloxane in the same way as in Example 1. The resulting solid component was suspended in 100 ml. of kerosene containing 50 ml. of titanium tetrachloride, and thus treated at 100° C. for 2 hours with stirring. The solid component was collected by filtration, and washed with purified hexane until free titanium tetrachloride was no longer detected. The resulting catalyst component (A) contained 3.0% by weight of titanium and 61.2% by weight of chlorine vent-soluble polymer. The powdery polymer had an n-heptane extraction residue of 94.4%, and an apparent density of 0.31 g/ml. The average specific polymerization activity of the catalyst was 306 g of polypropylene/Ti-m-mol.hr.atm.

EXAMPLES 11 TO 15

In each run, a catalyst component (A) was prepared under the same conditions as in Example 1 except that each of the polysiloxanes shown in Table 5 was used instead of the methyl polysiloxane. Propylene was polymerized in the same way as in Example 1 using the catalyst component (A) in the amount shown in Table 5. The results are shown in Table 5.

Table 5

| | Catalyst component (A) | | | | Results of polymerization | | | |
|---|---|---|---|---|---|---|---|---|
| | | Ti and Cl contents | | | Yield of polymer (g) | | Extraction residue of powdery | Apparent | Average |
| Examples | Organic polysiloxane (amount in ml.) | Ti (wt. %) | Cl (wt. %) | | Powdery polymer | Soluble polymer | polymer (%) | density (g/ml.) | specific activity* |
| 11 | octaphenyl trisiloxane (3) | 3.4 | 59.7 | | 282.6 | 16.7 | 93.4 | 0.29 | 380 |
| 12 | 2,4,6-Trimethyl cyclotrisiloxane (3) | 3.4 | 60.2 | | 291.1 | 16.0 | 94.0 | 0.29 | 390 |
| 13 | Octamethyl cyclotetrasiloxane (3) | 3.6 | 59.5 | | 298.8 | 18.6 | 93.8 | 0.28 | 403 |
| 14 | Decamethylcyclopentasiloxane (3) | 3.0 | 61.0 | | 292.5 | 15.7 | 93.7 | 0.29 | 366 |
| 15 | Octaphenyl cyclotetrasiloxane (3) | 3.0 | 60.0 | | 280.7 | 13.8 | 93.9 | 0.28 | 374 |

*Same as the footnote to Table 3.

calculated as atoms.

Polymerization:

A 2-liter autoclave was charged with 750 ml. of purified kerosene, 0.095 ml. (0.375 m-mol) of triisobutyl aluminum and 59.5 ml. (0.0375 m-mol calculated as titanium atom) of the catalyst component (A). The polymerization system was heated, and when the temperature

EXAMPLES 16 TO 29

A catalyst component (A) was prepared by the methods shown in Table 6 from the magnesium compound (i), the organo-polysiloxane (ii), the organic carboxylic acid (iii) and the titanium compound (iv) shown in Table 6.

Polymerization:

A 2-liter autoclave was charged with 0.05 ml. (0.375 m-mol) of triethyl aluminum, 43.8 mg (0.0375 m-mol calculated as titanium atom) of the titanium-containing solid component (A) obtained above and 750 ml. of purified kerosene sufficiently free from oxygen and moisture. The polymerization system was heated, and when the temperature reached 60° C., propylene was introduced. Polymerization of the propylene was started at a total pressure of 8.0 Kg/cm². After continuing the polymerization of 60° C. for 3 hours, the introduction of propylene was stopped. The inside of the autoclave was cooled to room temperature, and the catalyst was decomposed by addition of methanol. The solid component was collected by filtration, washed with methanol, and dried.

The results are shown in Table 6.

Table 6

| | Catalyst component (A) | | | | | | |
|---|---|---|---|---|---|---|---|
| | Name and amount used, when contacting component (i) with components (i)–(iv) under pulverization | | | | | (A) Components of Ti and Cl | |
| Examples | Magnesium halide (i) (g) | Organo-poly-siloxane (ii) (ml.) | Organic carboxylic acid ester (iii) (g) | Ti Compound (iv) (g) | Modes of preparation[1] | Ti (wt. %) | Cl (wt. %) |
| 16 | MgCl₂ (20) | methylpolysiloxane (3) | isobutyl benzoate (0.2) | TiCl₄ (3.3) | (No. 1)** | 3.0 | 59.0 |
| 17 | " | methylhydropoly-siloxane (3) | ethyl-p-toluate (6.9) | phenoxy titanium trichloride (5.2) | (No. 3)** | 3.5 | 58.5 |
| 18 | " | methylchlorophenyl-silicon oil (3) | n-propyl benzoate (5.3) | 2,6-dimethyl-phenoxy titanium trichloride (4.2) | (No. 4)** | 3.6 | 59.5 |
| 19 | " | methylphenylpoly-siloxane (3) | ethyl p-anisate (5.4) | TiCl₄ (4.0) | (No. 5)** | 3.2 | 61.0 |
| 20 | " | methylpolysiloxane (3) | methyl p-toluate (4.9) | — | (No. 6)** | 3.0 | 60.0 |
| 21 | " | methylpolysiloxane (3) | n-hexyl benzoate (8.7) | TiCl₄ (4.0) | (No. 7)** | 2.8 | 62.0 |
| 22 | " | methylpolysiloxane (5) | ethyl cyclohexane carboxylate — TiCl₄  Adduct (12.1) | | (No. 8)** | 3.2 | 61.0 |
| 23 | " | hexamethyldisiloxane (3) | ethyl benzoate — TiCl₄  Adduct (14.3) | | (No. 9)** | 3.1 | 61.0 |

| | Results of polymerization | | | | |
|---|---|---|---|---|---|
| Examples | Amount of powdery polymer (g) | Amount of soluble polymer (g) | Extraction residue of the powdery polymer (%) | Apparent density (g/ml.) | Average specific activity* |
| 16 | 352.8 | 25.2 | 94.6 | 0.28 | 420 |
| 17 | 322.5 | 19.5 | 94.5 | 0.31 | 380 |
| 18 | 318.5 | 19.0 | 94.2 | 0.32 | 375 |
| 19 | 304.9 | 21.8 | 94.6 | 0.27 | 363 |
| 20 | 288.4 | 20.3 | 94.3 | 0.27 | 343 |
| 21 | 292.9 | 17.6 | 95.1 | 0.29 | 345 |
| 22 | 274.7 | 17.8 | 92.1 | 0.29 | 325 |
| 23 | 333.5 | 22.5 | 94.9 | 0.30 | 395 |

| | Catalyst component (A) | | | | | | |
|---|---|---|---|---|---|---|---|
| | Name and amount used, when contacting component (i) with components (i)–(iv) under pulverization | | | | | (A) Components of Ti and Cl | |
| Examples | Magnesium halide (i) (g) | Organo-poly-siloxane (ii) (ml.) | Organic carboxylic acid ester (iii) (g) | Ti Compound (iv) (g) | Modes of preparation[1] | Ti (wt. %) | Cl (wt. %) |
| 24 | MgCl₂ (20) | methylhydropoly-siloxane (5) | ethyl o-tolulate — TiCl₄  Adduct (14.9) | | (No. 10)** | 3.3 | 62.1 |
| 25 | " | methylpolysiloxane (3) | methyl o-toluate — TiCl₄  Adduct (17.9) plus TiCl₄ (3.1) | | (No. 11)** | 3.5 | 59.5 |
| 26 | " | methylphenylpoly-siloxane (3) | ethyl acetate — TiCl₄  Adduct (2.9) plus ethyl o-toluate (5.7) and TiCl₄ (3.1) | | (No. 12)** | 3.6 | 59.0 |
| 27 | adduct of MgCl₂ (i) and ethyl | methylpolysiloxane (3) | (ethyl benzoate) | TiCl₄ (3.0) | (No. 13)** adduct was used in | 3.1 | 62.0 |

TABLE 6-continued

| Examples | benzoate (iii)**** | | | | No. 4 | | |
|---|---|---|---|---|---|---|---|
| 28 | " | methylphenylpoly-siloxane (3) | (ethyl benzoate) | TiCl$_4$ (3.0) | (No. 13)** adduct was used in No. 3 | 2.9 | 61.0 |
| 29 | " | methylpolysiloxane (3) | (ethyl benzoate) | TiCl$_4$ (3.0) | (No. 13)** adduct was used in No. 5 | 3.1 | 61.0 |

| | Results of polymerization | | | | |
|---|---|---|---|---|---|
| Examples | Amount of powdery polymer (g) | Amount of soluble polymer (g) | Extraction residue of the powdery polymer (%) | Apparent density (g/ml.) | Average specific activity* |
| 24 | 357.5 | 25.0 | 94.9 | 0.28 | 425 |
| 25 | 314.0 | 23.5 | 94.7 | 0.28 | 375 |
| 26 | 340.9 | 25.4 | 95.3 | 0.30 | 407 |
| 27 | 270.1 | 23.3 | 94.6 | 0.29 | 326 |
| 28 | 265.1 | 19.3 | 94.2 | 0.28 | 316 |
| 29 | 255.1 | 16.7 | 94.2 | 0.28 | 302 |

[Note]
¹indicates the embodiments out of Nos. 1 through 13 of the specification.
*grams of polypropylene/Ti m-mol . hr . atm.
**10 g of the pulverized product is treated in 150 ml of kerosene dissolving 10 ml of TiCl$_4$ at 100° C. for 2 hours.
***10 g of the pulverized product is treated with 100 ml of TiCl$_4$ at 80° C. for 2 hours.
****200 ml of kerosene is first suspended in 20 g of MgCl$_2$ and then 15 ml of ethyl benzoate is added to the suspension. After the reaction at 120° C. for one hour, the solid fraction is collected by filtration, washed sufficiently with hexane and dried under reduced pressure. 239 g of ethyl benzoate is found contained in 1 g of the resulting adduct.

EXAMPLE 30

A 2-liter autoclave was charged with 750 ml. of kerosene sufficiently free from oxygen and moisture, 0.375 m-mol of triethyl aluminum, and 0.0375 m-mol of the solid catalyst component prepared in Example 1. The inside of the autoclave was heated at 40° C., and propylene was fed and polymerized at 1.5 Kg/cm$^2$.G for 15 minutes. Then, the propylene was replaced by a gaseous mixture separately prepared and consisting of 96.1% of propylene and 3.9% of ethylene. The temperature and the pressure were raised, and the gaseous mixture was polymerized at 60° C. and 2.5 Kg/cm$^2$.G for 3 hours. When the solid component was filtered off after the completion of polymerization, a white powdery solid polymer was obtained in an amount of 253.8 g. The amount of the solvent-soluble polymer was 16.1 g, and the ethylene content of the white powdery solid was 4.2 mole %.

What we claim is:
1. A process for preparing highly stereoregular polyolefins, which comprises polymerizing or copolymerizing α-olefins having at least 3 carbon atoms in the presence of a catalyst, said catalyst comprising
(A) a titanium-containing solid catalyst component composed of an organic complex derived from
(i) a magnesium dihalide,
(ii) an organo polysiloxane selected from at least one of the group consisting of:
compounds of the formula

$$Q(Q_2SiO)_nSiQ_3$$

wherein Q's are identical or different, and represent a moiety selected from the group consisting of hydrogen, alkyl, cycloalkyl and aryl, with the proviso that all Q moieties are not hydrogen at the same time, and n is an integer of 1 to 1000;
compounds of the formula $$(Q_2SiO)_n$$

wherein Q is the same as defined above, and n is an integer of 2 to 1000; and
compounds of the formula $$X(Q_2SiO)_nSiQ_2X$$

wherein Q is the same as defined above, n is an integer of 1 to 1000, and X is halogen,
(iii) an organic carboxylic acid ester, and
(iv) a titanium compound of the formula $$Ti(OR)_lX_{4-l}$$

wherein R is a moiety selected from the group consisting of alkyl groups and a phenyl group optionally substituted with an alkyl group with 1 to 4 carbon atoms, X is a halogen, and l is 0 or an integer of 1 to 4,
and
(B) at least one organoaluminum catalyst component of the formula $$R'_mAl(OR')_{3-m}$$

wherein R' moieties are identical or different, and represent alkyl, and m is a positive number of 1.5 to 3,
said organic complex being derived by bringing the component (i) into contact with a combination of the components (ii) and (iii) in a molar ratio (i)/(ii)/(iii) of 1/1000–0.01/10–0.005 or a combination of the components (ii), (iii) and (iv) in a molar ratio (i)/(ii)/(iii)/(iv) of 1/1000–0.01/10–0.005/100–0.001 under mechanical pulverization conditions and then, as an additional step, treating the resulting pulverized composition with the component (iv) in the absence of mechanical pulverization.

2. The process of claim 1 wherein said magnesium compound (i) is selected from the group consisting of magnesium chloride, magnesium bromide and magnesium iodide.

3. The process of claim 1 wherein said silicon component (ii) is selected from at least one of compounds of the formula $Q(Q_2SiO)_nSiQ_3$ wherein Q moieties are the same or different and each selected from the group consisting of hydrogen, $C_1-C_4$ alkyl, $C_3-C_8$ cycloalkyl and $C_6-C_8$ aryl; compounds of the formula $(Q_2SiO)_n$ wherein Q is the same as defined above and n is an integer of 2 to 1000; and compounds of the formula $X(Q_2SiO)_nSiQ_2X$ wherein Q and n are the same as defined above, and X is halogen.

4. The process of claim 1 wherein said organic carboxylic acid ester (iii) is an organic carboxylic acid ester selected from the group consisting of esters formed between $C_1-C_8$ saturated or unsaturated aliphatic carboxylic acids optionally substituted by halogens and alcohols selected from the group consisting of $C_1-C_8$ saturated or unsaturated aliphatic primary alcohols, $C_3-C_8$ saturated or unsaturated alicyclic alcohols and $C_1-C_4$ saturated or unsaturated aliphatic primary alcohols substituted by $C_6-C_8$ aromatic moieties or halogen; esters formed between $C_7-C_{12}$ aromatic monocarboxylic acids and alcohols selected from the group consisting of $C_1-C_8$ saturated or unsaturated aliphatic primary alcohols, $C_3-C_8$ saturated or unsaturated alicyclic alcohols and $C_1-C_4$ saturated or unsaturated aliphatic primary alcohols substituted by $C_6-C_8$ aromatic moieties or halogen; and alicyclic carboxylic acid esters selected from the group consisting of methyl cyclopentanecarboxylate, methyl hexahydrobenzoate, ethyl hexahydrobenzoate, methyl hexahydrotoluate and ethyl hexahydrotoluate.

5. The process of claim 1 wherein the amount of said catalyst is such that the proportion of said titanium-containing solid catalyst component (A) is 0.0001 to 1.0 m-mol/liter, calculated as titanium atom, based on the volume of the liquid phase of the polymerization system, and the proportion of said organoaluminum catalyst component (B) is 1/1 to 100/1 in terms of the aluminum atom/titanium atom ratio.

6. The process of claim 1 wherein said organic carboxylic acid ester (iii) is an organic carboxylic acid ester selected from the group consisting of esters formed between $C_1-C_4$ saturated or unsaturated aliphatic carboxylic acids optionally substituted by halogens and alcohols selected from the group consisting of $C_1-C_4$ saturated or unsaturated aliphatic primary alcohols, $C_5-C_6$ saturated or unsaturated alicyclic alcohols and $C_1-C_4$ saturated or unsaturated aliphatic primary alcohols substituted by $C_6-C_8$ aromatic moieties or halogen; esters formed between $C_7-C_{10}$ aromatic monocarboxylic acids and alcohols selected from the group consisting of $C_1-C_4$ saturated or unsaturated aliphatic primary alcohols, $C_5-C_6$ saturated or unsaturated alicyclic alcohols and $C_1-C_4$ saturated or unsaturated aliphatic primary alcohols substituted by $C_6-C_8$ aromatic moieties or halogens; and alicyclic carboxylic acid esters selected from the group consisting of methyl cyclopentanecarboxylate, methyl hexahydrobenzoate, ethyl hexahydrobenzoate, methyl hexahydrotoluate and ethyl hexahydrotoluate.

7. The process of claim 3 wherein said silicon component (ii) is a linear alkyl polysiloxane.

8. The process of claim 7 wherein the linear alkyl polysiloxane is selected from at least one of the group consisting of methyl polysiloxane and ethyl polysiloxane, each having a viscosity of not more than 200 centipoises at 25° C.

9. The process of claim 6 wherein the organic carboxylic acid ester (iii) is a $C_1-C_4$ primary alkyl ester of an aromatic carboxylic acid.

10. The process of claim 9 wherein the ester is selected from the group consisting of methyl benzoate and ethyl benzoate.

11. The process of claim 1 wherein the titanium compound (iv) is a titanium tetrahalide.

12. The process of claim 11 wherein the titanium tetrahalide is titanium tetrachloride.

13. The process of claim 1 wherein R' is a $C_1-C_4$ straight-chain or branched-chain alkyl.

14. The process of claim 13 wherein the organoaluminum catalyst component is triethyl aluminum, tributyl aluminum, or their combination.

15. The process of claim 1 wherein said titanium-containing solid catalyst component composed of an organic complex is derived by bringing the component (i) into contact with components (ii), (iii) and (iv) under mechanical pulverization conditions and then, as an additional step, treating the resulting pulverized composition with the component (iv) in the absence of mechanical pulverization.

16. The process of claim 1 wherein said titanium-containing solid catalyst component composed of an organic complex is derived by bringing the component (i) into contact with components (ii) and (iii) under mechanical pulverization conditions and then, as an additional step, treating the resulting pulverized composition with the component (iv) in the absence of mechanical pulverization.

17. The process of claim 1 wherein said titanium-containing solid calalust component composed of an organic complex is derived by bringing the component (i) into contact with components (ii) and (iii) under mechanical pulverization conditions, then contacting the resulting pulverized product with the component (iv) under mechanical pulverization conditions and then, as an additional step, treating the resulting pulverized composition with the component (iv) in the absence of mechanical pulverization.

18. The process of claim 1 wherein said titanium-containing solid catalyst component composed of an organic complex is derived by bringing the component (i) into contact with component (iii) under mechanical pulverization conditions, then contacting the resulting pulverized product with the component (ii) under mechanical pulverization conditions and then, as an additional step, treating the resulting pulverized composition with the component (iv) in the absence of mechanical pulverization.

19. The process of claim 1 wherein said titanium-containing solid catalyst component composed of an organic complex is derived by bringing the component (i) into contact with component (iii) under mechanical pulverization conditions, then contacting the resulting pulverized product with the component (ii) under mechanical pulverization conditions, and further contacting the resulting pulverized product with the component (iv) under mechanical pulverization conditions and then, as an additional step, treating the resulting pulverized composition with the component (iv) in the absence of mechanical pulverization.

20. The process of claim 1 wherein said titanium-containing solid catalyst component composed of an organic complex is derived by bringing the component (i)

into contact with component (ii) under mechanical pulverization conditions, then contacting the resulting pulverized product with the component (iii) under mechanical pulverization conditions and then, as an additional step, treating the resulting pulverized composition with the component (iv) in the absence of mechanical pulverization.

21. The process of claim 1 wherein said titanium-containing solid catalyst component composed of an organic complex is derived by bringing the component (i) into contact with component (ii) under mechanical pulverization conditions, then contacting the resulting pulverized product with the component (iii) under mechanical pulverization conditions, and further contacting the resulting pulverized product with the component (iv) under mechanical pulverization conditions and then, as an additional step, treating the resulting pulverized composition with the component (iv) in the absence of mechanical pulverization.

22. The process of claim 1 wherein said titanium-containing solid catalyst component composed of an organic complex is derived by bringing the component (i) into contact with component (ii) and an adduct of component (iv) and component (iii) under mechanical pulverization conditions, and then, as an additional step, treating the resulting pulverized composition with the component (iv) in the absence of mechanical pulverization.

23. The process of claim 1 wherein said titanium-containing solid catalyst component composed of an organic complex is derived by bringing the component (i) into contact with component (ii) under mechanical pulverization conditions, then contacting the resulting pulverized product with an adduct of component (iv) and component (iii) under mechanical pulverization conditions and then, as an additional step, treating the resulting pulverized composition with the component (iv) in the absence of mechanical pulverization.

24. The process of claim 1 wherein said titanium-) containing solid catalyst component composed of an organic complex is derived by bringing the component (i) into contact with components (ii), (iii) and an adduct of component (iv) and component (iii) under mechanical pulverization conditions and then, as an additional step, treating the resulting pulverized composition with the component (iv) in the absence of mechanical pulverization.

25. The process of claim 1 wherein said titanium-containing solid catalyst component composed of an organic complex is derived by bringing the component (i) into contact with components (ii), (iv) and an adduct of component (iv) and component (iii) under mechanical pulverization conditions and then, as an additional step, treating the resulting pulverized composition with the component (iv) in the absence of mechanical pulverization.

26. The process of claim 1 wherein said titamium-containing solid catalyst component composed of an organic complex is derived by bringing the component (i) into contact with components (ii), (iii), (iv) and an adduct of component (iv) and component (iii) under mechanical pulverization conditions and then, as an additional step, treating the resulting pulverized composition with the component (iv) in the absence of mechanical pulverization.

27. A catalyst for polymerization or copolymerization of α-olefins having at least 3 carbon atoms consisting essentially of
(A) a titanium-containing solid catalyst component composed of an organic complex derived from
(i) a magnesium dihalide
(ii) an organo polysiloxane selected from at least one of the group consisting of:
compounds of the formula $$Q(Q_2SiO)_nSiQ_3$$

wherein Q's are identical or different, and represent a moiety selected from the group consisting of hydrogen, alkyl, cycloalkyl and aryl, with the proviso that all Q moieties are not hydrogen at the same time, and n is an integer of 1 to 1000;
compounds of the formula $$(Q_2SiO)_n$$

wherein Q is the same as defined above, and n is an integer of 2 to 1000; and
compounds of the formula $$X(Q_2SiO)_nSiQ_2X$$

wherein Q is the same as defined above, n is an integer of 1 to 1000, and X is a halogen,
(iii) an organic carboxylic acid ester, and
(iv) a titanium compound of the formula $$Ti(OR)_lX_{4-l}$$

wherein R is a moiety selected from the group consisting of alkyl groups and a phenyl group optionally substituted by an alkyl group with 1 to 4 carbon atoms, X is a halogen, and l is 0 or an integer of 1 to 4,
and
(B) at least one organoaluminum catalyst component of the formula $$R'_mAl(OR')_{3-m}$$

wherein R' moieties are identical or different, and represent alkyl, and m is a positive number of 1.5 to 3,
said organic complex being derived by bringing the component (i) into contact with a combination of the components (ii) and (iii) in a molar ratio (i)/(ii)/(iii) of 1/1000–0.01/10–0.005 or a combination of the components (ii), (iii) and (iv) in a molar ratio (i)/(ii)/(iii)/(iv) of 1/1000–0.01/10–0.005/100–0.01 under mechanical pulverization conditions and then, as an additional step, treating the resulting pulverized composition with the component (iv) in the absence of mechanical pulverization.

* * * * *